July 23, 1968     J. B. WRIGHT ET AL     3,394,334

FUSIBLE LOAD DEVICE WITH INDICATING MEANS

Original Filed Aug. 25, 1964

James B. Wright
James Darryl Holder,
      INVENTORS.

3,394,334
FUSIBLE LOAD DEVICE WITH
INDICATING MEANS
James B. Wright and James Darryl Holder, Huntsville,
Ala., assignors to the United States of America as represented by the Secretary of the Army
Original application Aug. 25, 1964, Ser. No. 392,377, now Patent No. 3,348,096. Divided and this application May 26, 1967, Ser. No. 652,363
2 Claims. (Cl. 337—241)

ABSTRACT OF THE DISCLOSURE

A load device which has a fuse wire and indicating means such as a light colored backing strip, a backing strip with combustible or mildly explosive chemicals, or a monitor wire arrangement for indicating the condition of the fuse wire. The load device is used in variable pulse energy discriminator circuitry.

This invention may be manufactured and used by or for the Government for governmental purposes without the payment of any royalty thereon.

This application is a division of applicants' copending application Ser. No. 392,377, filed Aug. 25, 1964, now Patent No. 3,348,096.

This invention relates to an electronic circuit for detecting the level of energy contained in a pulse with respect to a preset potential and thereby providing a closed circuit to a load device when the impressed energy is above the preset value.

In exploding bridge wire systems, there is a need for a test circuit device that can be used repeatedly for testing the condition of the exploding bridge wire system. In addition to being capable of repeated use, the test circuit device needs to be accurate, reliable, fast acting and have a long life span.

Therefore, it is an object of this invention to provide a variable pulse energy discriminator device that is reliable, simple, accurate and fast acting for testing of exploding bridge wire systems.

Another object of this invention is to provide a variable pulse energy discriminator device that includes a normally open switch device that will close at a finely defined threshold level.

A further object of this invention is to provide a variable pulse energy discriminator device that is applicable for detecting and/or protecting against voltage surges, lightning influx, and static potentials on power lines, missiles, aircraft, railroad, automotive, and other similar mechanisms.

A still further object of this invention is to provide a variable pulse energy discriminator device that is unpowered and is therefore readily useful for long term or permanent monitoring and/or protection.

Yet another object of this invention is to provide a new and novel load device for use in the circuit of a variable pulse energy discriminator.

In accordance with this invention, a variable pulse energy discriminator device is provided that has an electric circuit with a gas filled spark gap device therein. The gas filled spark gap device is designed with the circuit so that when an impressed high voltage above a preset value is supplied to the gas filled spark gap device, the gas filled spark gap device will provide a closed circuit to a load device for the high voltage.

In the accompanying drawing forming a part of this specification, and in which like numerals are employed to designate corresponding parts throughout the same:

Figure 1:
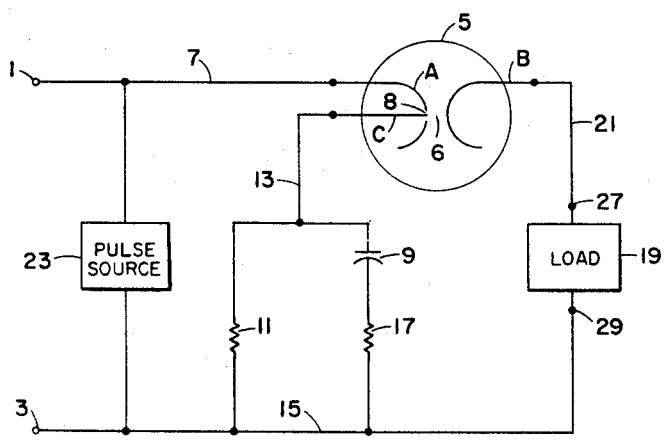
FIGURE 1 is a circuit diagram of a variable pulse energy discriminator device.

Referring to FIGURE 1, input terminal 1 is adapted to be connected to the equipment or items to be tested or protected, and common terminal 3 is adapted to be connected to ground or a common point of the equipment or items. If proper precautions are taken, terminals 1 and 3 may have their functions interchanged.

A multiple element gas filled spark gap device 5 is shown as having main electrodes A and B that form a discharge gap 6 and a trigger probe electrode C that forms an ignition gap 8 with electrode A. Electrode A is connected to terminal 1 by lead 7. Trigger probe electrode C is connected to one side of capacitor 9 and resistor 11 by lead 13. The other side of resistor 11 is connected to terminal 3 by lead 15, and the other side of capacitor 9 is connected through resistor 17 to lead 15.

Electrode B is connected to one side of load device 19 by lead 21, and the other side of load device 19 is connected to terminal 3 by lead 15.

A high voltage supply calibration device 23 is connected to leads 7 and 15 to provide a high voltage pulse when desired so that the triggering voltage level of the circuit may be adjusted by varying circuit parameters, particularly the value of resistor 17 and capacitor 9. Calibration device 23 may be built directly into the circuit or may be a separate unit reserved for periodic calibration.

In operation, when a high voltage is impressed across terminals 1 and 3, the full potential is developed between electrodes A and C. If the impressed voltage is of sufficient magnitude, ignition gap 8, which is a low energy quick response gap, will begin to conduct energy and inject a quantity of ions into discharge gap 6. This energy from the ignition gap mainly flows into capacitor 9 and charges it to some voltage, the rate of charge being controlled by resistor 17. The ignition gap will cease conduction when this charging current falls below the minimum arc holding value. The intensity of the arc in ignition gap 8 controls the amount of ionization and injection energy of these particles in discharge gap 6. These factors with the impressed voltage across electrodes A and B determine if discharge gap 6 conducts. For all items being fixed, this circuit will selectively conduct from terminals 1 and 3 to load device 19 those voltage levels which are above a preselected level.

Between arcs of ignition gap 8, resistor 11, which has a high ohmic value, discharges capacitor 9.

Figure 2:
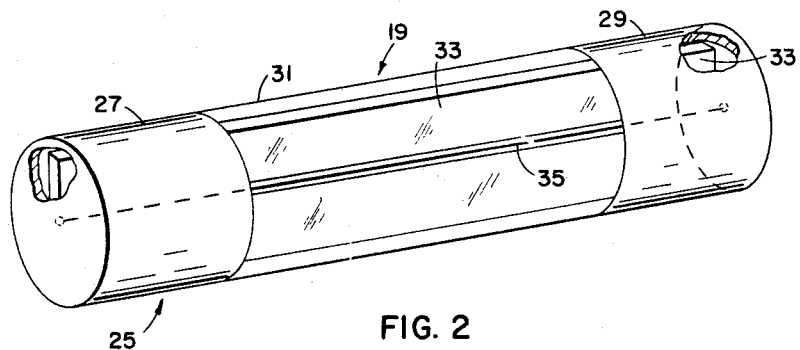
FIGURE 2 is a perspective view, partially cutaway, of a load device that may be used in a variable pulse energy discriminator circuit.

A basic load device suitable for use in the above described circuit is shown in FIGURE 2 and includes a hollow housing 25 that has metallic end terminals 27, 29 and an intermediate transparent section 31. A backing strip 33 is mounted in housing 25 in a conventional manner, and a fuse wire 35 is imbedded in or in close contact with backing strip 33 with one end connected to end terminal 27 and the other end connected to end terminal 29. Backing strip 33 serves as a mechanical support for fuse wire 35 and aids in visually determining the state of this wire. Backing strip 33 may be made of paper, fiber, plastic or some other electrical non-conductor. Backing strip 33 is preferably light in color on the side that the fuse wire is nearest in order to intercept and retain as a smudge the metallic vapors and other products of wire fusion.

Alternatively, backing strip 33 may be coated with, impregnated with or made from combustible or mildly explosive chemicals which will ignite upon fusion of the fuse wire. These chemicals may be of differing sensitivities and separated to prevent one from igniting another so that an approximation of the energy released upon fusing of the fuse wire can be obtained by recognizing the least sensitive ignited chemical. Still further, the fuse wire may also be monitored by the use of a photosensitive electric device (not shown) which can detect the light flash as the fuse wire fuses or the light flash of any combustible or mildly explosive chemicals used. The output of this photosensitive electric device can in turn, make an indication by the use of lights, meters or other suitable means.

Figure 3:
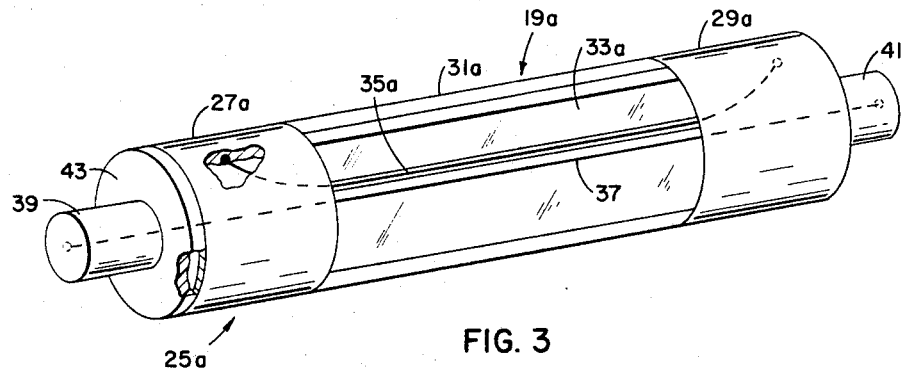
FIGURE 3 is a perspective view, partially cutaway, of another load device that may be used in the variable pulse energy discriminator circuit.

A further refinement of the basic load device shown in FIGURE 2 is illustrated in FIGURE 3. In this device 19a, elements 25a, 27a, 29a, 31a, 33a, and 35a correspond to and have the same function as elements 25, 27, 29, 31, 33 and 35 respectfully as described relative to FIGURE 2 supra. In addition to the common elements of these two devices, this device includes a monitor wire 37 that is connected in a conventional manner to terminal 39 at one end and to terminal 41 at the other end. Terminal 39 is connected to terminal 27a by insulating spacer means 43 and terminal 41 is connected to terminal 29a by an insulating spacer means similar to spacer 43.

The use and action of this device is similar to the previous one with the addition of the capability of electrically monitoring the event of fusing of fuse wire 35a. This monitoring is effected by having monitor wire 37 disposed so as to be rendered discontinuous by fusing of fuse wire 35a or by the ignition of associated chemicals. The fact that monitor wire 37 has been broken can be determined by blocking and electric current that would flow either continuously or intermittently through the monitor wire. The fact that this current can no longer flow can be determined by a lamp, meter, relay, or other suitable means (not shown).

Fusible wire 35 or 35a as discussed relative to FIGURES 2 and 3 respectfully is a metallic filament of rather small diameter. A size found to be successful was approximately 0.002 inch diameter. In the aforementioned case, the system level was approximately one joule at 2000 volts. Since current is the property that causes wire fusion, the wire size must be selected so that the peak current at the voltage and energy levels used equals or exceeds 500 amperes per circular mil of wire cross-sectional area. The chemical composition of the fuse wire used has some effect on the intensity of fusion, and the chemical stability of the wire must be particularly considered if the fuse wire is to be used with combustible or mildly explosive chemicals. With these considerations borne in mind, the selection of a gold alloy would be a good choice.

It is to be understood that the form of our invention, herewith shown and described, is to be taken as a preferred example of the same, and that various changes in the arrangement of parts may be resorted to, without departing from the spirit of our invention, or the scope of the subjoined claims.

We claim:
1. A load device including: a hollow housing, said housing having two electrical terminals that are interconnected by an intermediate transparent section, an electrical non-conductor backing strip mounted in said housing between said terminals, a fuse wire in said housing and connected to said terminals in such a manner that said fuse wire is supported by said backing strip, and means in said housing for indicating the condition of the fuse wire, said indicating means including combustible chemicals of differing sensitivities mounted in spaced apart relation on said backing strip.

2. A load device as set forth in claim 1 wherein, said indicating means further includes a monitor wire that is mounted in said housing adjacent said fuse wire.

References Cited

UNITED STATES PATENTS

| | | | |
|---|---|---|---|
| 307,639 | 11/1884 | Gilliland | 200—121 |
| 449,289 | 3/1891 | Maxstadt | 200—135 |
| 737,368 | 8/1903 | Downes | 200—121 |
| 1,094,030 | 5/1914 | Sprong et al. | 200—131 |
| 1,314,583 | 9/1919 | Feldkamp | 200—121 |
| 2,115,428 | 5/1938 | Quisling | 200—121 |

FOREIGN PATENTS

| | | |
|---|---|---|
| 930,526 | 7/1963 | Great Britain. |

BERNARD A. GILHEANY, *Primary Examiner.*

R. N. ENVALL, JR., *Assistant Examiner.*